Sept. 9, 1930.  M. H. LOUGHRIDGE  1,775,169
SYSTEM OF AUTOMATIC TRAIN CONTROL
Filed Sept. 19, 1924  5 Sheets-Sheet 1

Matthew H. Loughridge, Inventor.

Sept. 9, 1930.    M. H. LOUGHRIDGE    1,775,169
SYSTEM OF AUTOMATIC TRAIN CONTROL
Filed Sept. 19, 1924    5 Sheets-Sheet 2
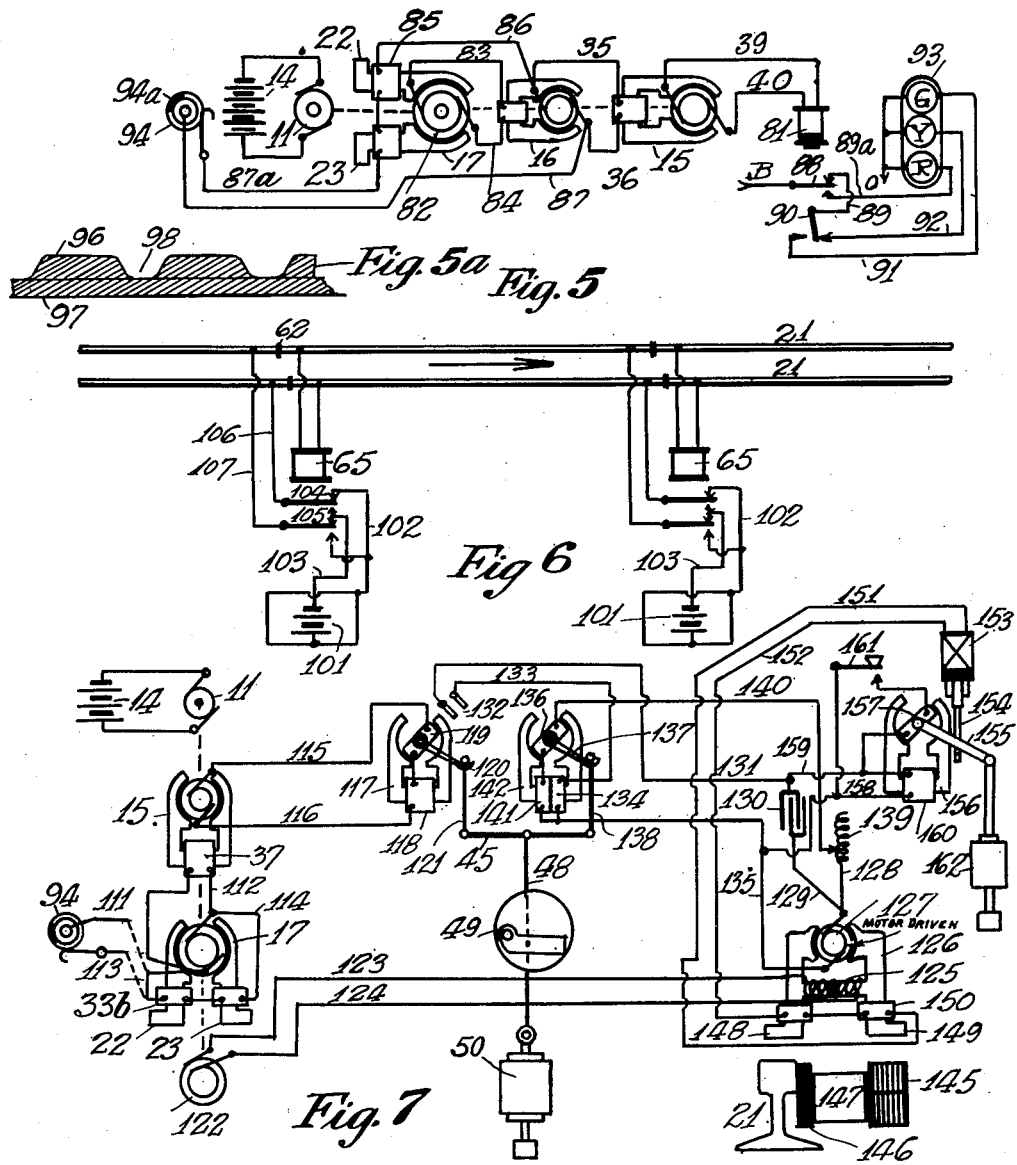

Sept. 9, 1930.   M. H. LOUGHRIDGE   1,775,169
SYSTEM OF AUTOMATIC TRAIN CONTROL
Filed Sept. 19, 1924   5 Sheets-Sheet 3

Matthew H. Loughridge, Inventor

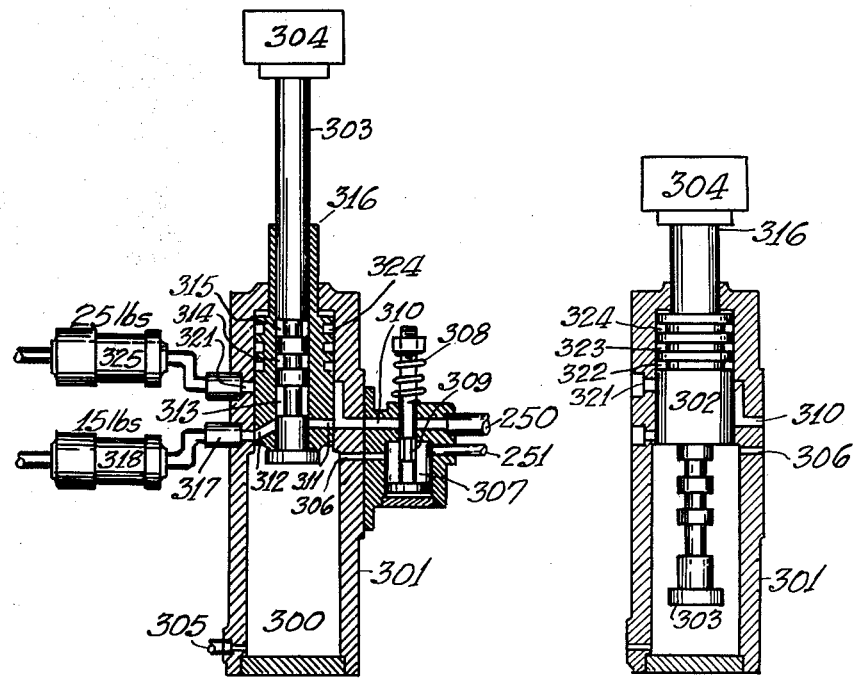

Sept. 9, 1930.     M. H. LOUGHRIDGE     1,775,169
SYSTEM OF AUTOMATIC TRAIN CONTROL
Filed Sept. 19, 1924     5 Sheets-Sheet 5
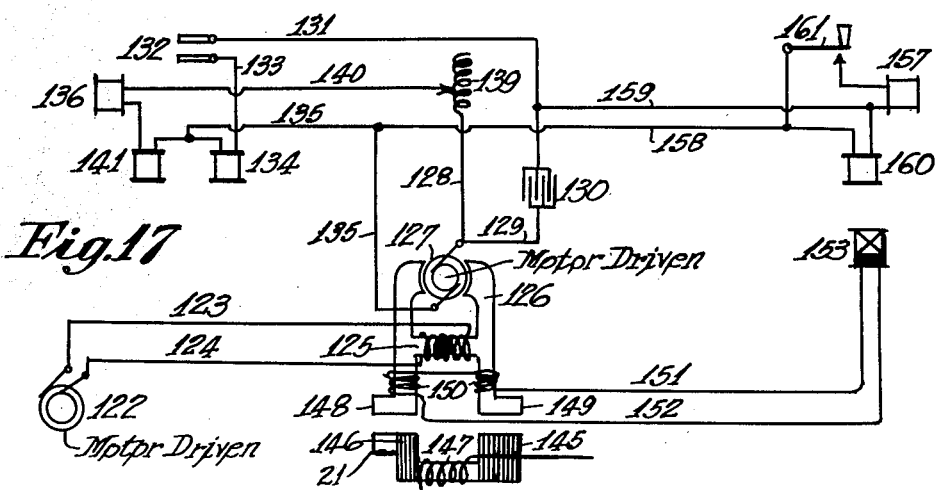
*Fig.17*
*a* Current in 141-136    NORMAL RUNNING
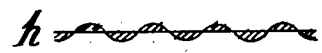
*g* Current in 141-136    WITH 126 OVER 145 AND COIL 147 ON OPEN CIRCUIT
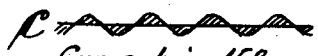
*b* Current in 134-160    "
*h* Current in 134-160    "
*c* Current in 153    "
*j* Current in 153    "
*d* Current in 141-136    WITH 126 OVER 145 AND 147 ENERGIZED WITH D.C.
*k* Current in 141-136    WITH 126 OVER 145 AND COIL 147 CLOSED BUT DE-ENERGIZED
*e* Current in 134-160    "
*l* Current in 134-160    "
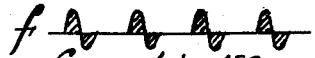
*f* Current in 153    "
*m* Current in 153    "
*Fig.18*
INVENTOR.
M. H. Loughridge Patented Sept. 9, 1930

1,775,169

UNITED STATES PATENT OFFICE

MATTHEW H. LOUGHRIDGE, OF BOGOTA, NEW JERSEY

SYSTEM OF AUTOMATIC TRAIN CONTROL

Application filed September 19, 1924. Serial No. 738,562.

Figure 1:
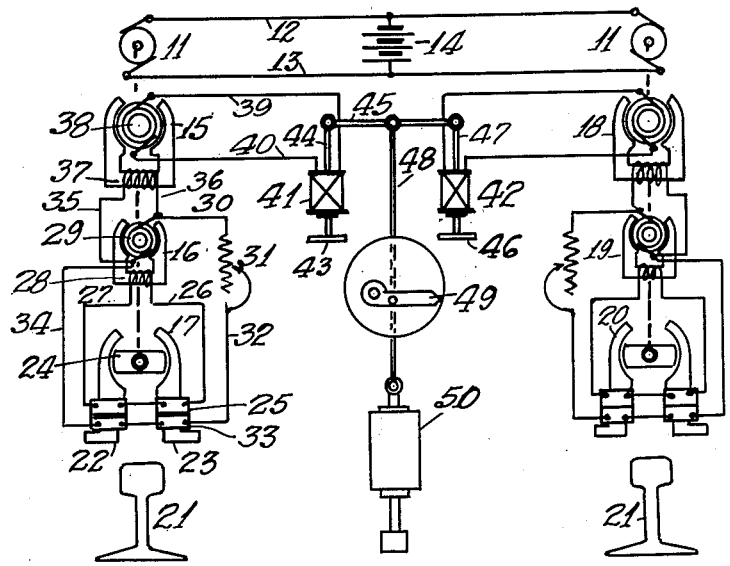
Figure 2:
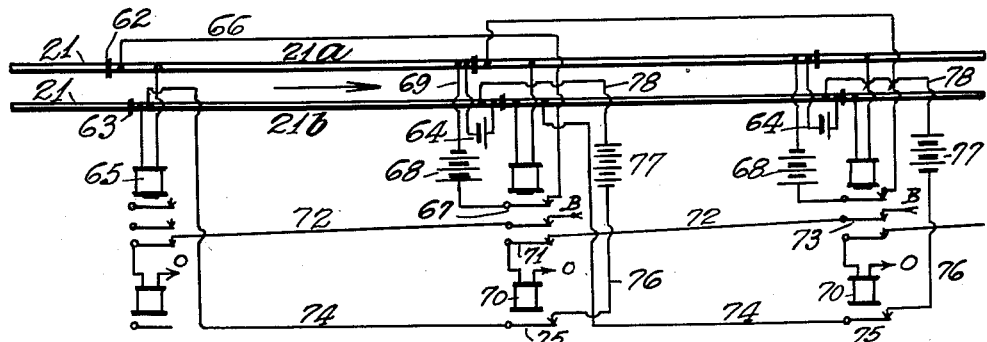
Figures 3, 4:
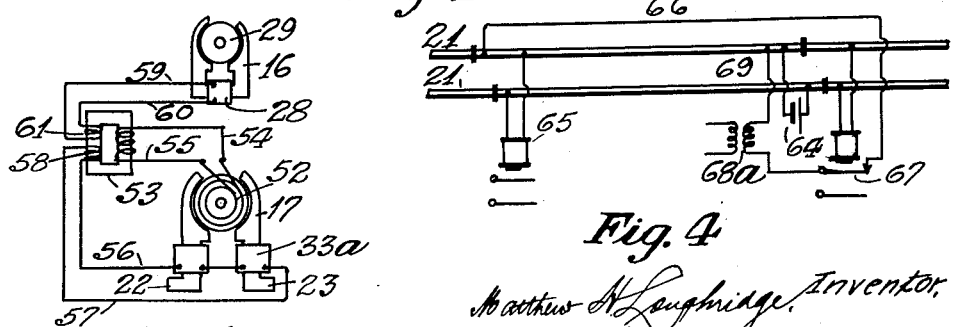
Figure 8:
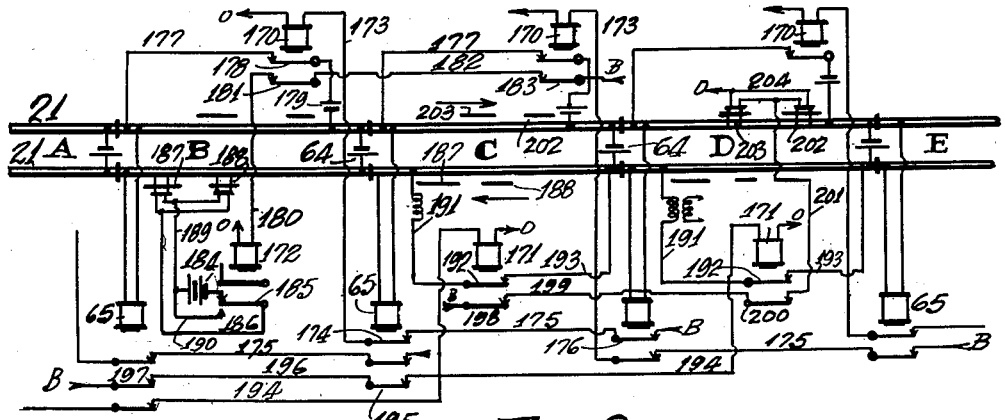
Figures 9, 10, 11:
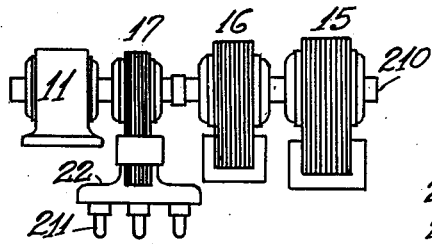
Figures 13, 14:
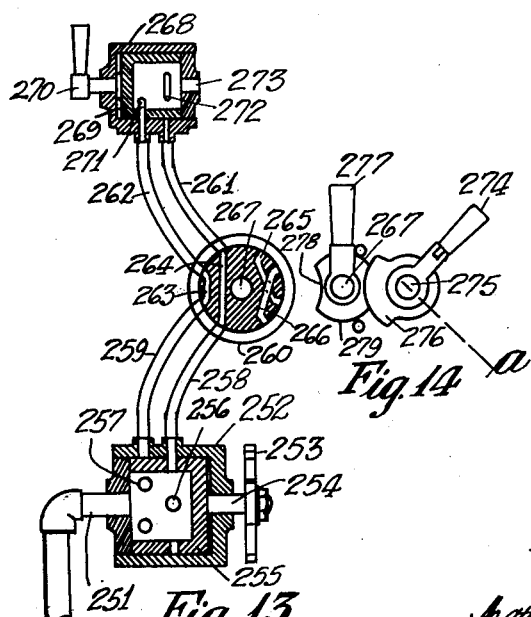
Figure 12:
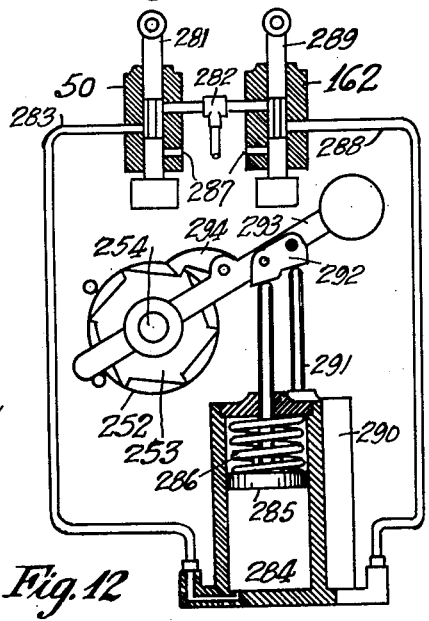

This invention relates to a system of automatic train control and has for an object to provide a system of this kind which is mainly operated by induction between the track and the train, which takes up the controlling current for the train from the running rails, which amplifies this current by the application of mechanical motion, which uses a self excited amplifier controlled by the current in the track, which will operate on direct or alternating current, which is suitable for single and double track operation, and which may be operated by current taken up from the track and by devices on the track arranged for intermittent control and a further object of the invention is to provide a braking system controlled by the speed of the train, by traffic conditions and by the position of a manually controlled brake valve. These and other objects of the invention will be more particularly understood from the following specification and the accompanying drawings in which Fig. 1, shows the controlling circuits on a locomotive or vehicle, Fig. 2 shows one arrangement of circuits on the track that may be used with Fig. 1. Fig. 3 is a modification in the vehicle circuits and Fig. 4 shows a plan of track wiring adapted for use with Fig. 3. Fig. 5 shows another arrangement of vehicle circuits; Fig. 5ª is a curve indicating the flux density of the amplifier; Fig. 6 is a track diagram showing an arrangement of circuits that may be used with Fig. 5. Fig. 7 shows an arrangement of vehicle circuits that may be used for continuous and intermittent control, Fig. 8 shows a track wiring plan adapted for single track operation, Fig. 9 shows one arrangement of coupling the amplifiers and motor on the same shaft, Fig. 10 is an end elevation of the detector amplifier showing its relation to the running rail, Fig. 11 is a detail of Fig. 10, Fig. 12 shows the operation of the braking system, Fig. 13 shows in section the operation of the brake valves, Fig. 14 is a locking arrangement between the braking system and the engineer's brake valve, Figs. 15 and 16 show the brake application valve, Fig. 17 is a skeleton circuit corresponding to Fig. 7 and Fig. 18 is a development of the circuit characteristics produced under different conditions in Fig. 17.

The present system of train control contemplates taking up the controlling influence from the running rails of the track as the train proceeds through the block. Systems of this kind are sometimes called continuous inductive as the controlling influence is continuously maintained on the vehicle under clear track conditions. The influence from the rails is received by an inductor having a moving element which, by the introduction of mechanical power, amplifies this influence which, in turn, is used to energize another inductor having a moving element where the influence is again amplified and this effect may be continued until the final result produces a current of the desired magnitude which originates from and is controlled by the current in the track rails. The current in the track rails may be direct or alternating; if alternating, the amplified current on the vehicle will naturally be alternating; but if direct, the amplified current may be direct or the amplifier itself may convert the direct current into alternating current. The system is so arranged that part of the amplified current may be used to energize the amplifier fields thereby increasing the effect of amplification without, however, removing the primary control of the current in the track rails. When the track rails are energized by direct current, the direction of the amplified current is controlled by the direction of the current in the rails so that the polarity of the current on the vehicle is controlled by the polarity of the track current.

When the continuous and intermittent control are used, the continuous control is arranged to dominate the intermittent control. The device responsive to the intermittent control is arranged to be continuously energized by high frequency alternating current which is deflected by the track device to deenergize one circuit on the vehicle and energize another, the latter being used for speed control purposes. This device is arranged to receive an effect when the track device is energized by direct current which effect establishes the proceed condition.

Referring to Fig. 1, 11 represents a motor which supplies the mechanical motion to the amplifiers 15, 16 and 17. This motor is continuously driven from the battery 14 to which it is connected by wires 12 and 13. The track rail is indicated by 21 over which the poles 22 and 23 of the detector-amplifier 17 are carried. The armature 24 is rotated by the motor 11 at high speed between these poles. This armature as shown, consists of a bar of magnetic iron which, as it rotates, closes and interrupts the magnetic circuit between the poles 22 and 23. If a continuous magnetic field is induced by the rail 21 in poles 22 and 23 it is apparent that this field will be varied as the magnetic circuit is varied by the rotation of armature 24. This will induce an alternating current in the coils 25 and in wires 26 and 27 connected to the field coil 28 of amplifier 16. Amplifier 16 is constructed like a D. C. generator having an armature 29 with a commutator and which generates a direct current when its field is energized by direct current and generates an alternating current when its field is energized by alternating current. Under these conditions the armature 29 driven by the motor 11 will generate an A. C. current in wires 35 and 36 and field coil 37 of the amplifier 15. The armature 38, driven by the motor 11 generates an amplified A. C. current in wires 39 and 40 and in the translating device 41. It is apparent that the current energizing 41 is the product of the flux induced from the rail in poles 22 and 23 and the mechanical energy applied to the armatures 24, 29 and 38.

The poles 22 and 23 are provided with self-exciting coils 33 connected by wires 32 and 34 to the armature 29 through the variable inductance 31. Thus part of the current generated by the armature 29 through the connection 30 is used to energize the self exciting coils 33 and thereby increase the induced effect from the rails. The inductance 31 is used to bring the current in coils 33 into phase with the current in coils 25 and the characteristics of the circuit may require that a condenser be substituted for this inductance. The amplifiers described have the characteristics of an input circuit 26—27 and an output circuit 39—40 which are common to amplifiers in general and as far as the amplifying effect is concerned any commercial type of amplifier may be substituted for the type shown.

As shown in Fig. 1, a duplicate set of detector-amplifiers are used, the set to the right being indicated by 18, 19 and 20 and being used to energize the translating device 42 from the opposite rail by an arrangement of circuits similar to that just described.

The translating device 41 has an armature 43 operating the plunger 44 and the device 42 has an armature 46 operating the plunger 47. These plungers are connected by a walking beam 45 with the rod 48 which operates the visual indicator 49 and the brake mechanism control valve 50.

In Fig. 2, 21$^a$ and 21$^b$ represent the track rails of a section of track which is divided into blocks by the insulated joints 62 and 63. A track battery 64 is connected across these rails at one end of the block and a track relay 65 is connected to the rails at the opposite end of the block according to the arrangement of the well known track circuit. The track relay 65 is controlled through one block but the relay 70 is controlled over two blocks via a circuit beginning at the common wire O through the relay, contact 71 of the first track relay, wire 72 and contact 73 of the next track relay to battery "B," relay 70 thus being controlled through two blocks.

In the present arrangement another circuit is established in the track rails beginning at connection 69, and proceeding through battery 68, contact 67 of the track relay for the block in advance and wire 66 to the opposite end of the rail section 21$^a$. When said track relay is energized rail 21$^a$ is energized from battery 68. The opposite rail section is also energized by wire 74, contact 75 of relay 70 of the block in advance, wire 76, battery 77 and connection 78 to rail 21$^b$. This section of rail 21$^b$ is, therefore, energized when the two sections of track immediately in advance are clear. The batteries 68 and 77 are independent of each other and of the track battery 64 so that there is no conflict in the operation of these circuits. The circuits including batteries 68 and 77 respectively, are sometimes called trackway circuits to distinguish from the regular track circuits.

When a vehicle equipped as shown in Fig. 1, runs over rails 21$^a$ and 21$^b$ a field is induced in the poles of the detector-amplifiers 17 and 20 which field is proportional to the current in the rails. This is converted into an amplified alternating current which energizes 41 from one rail and energizes 42 from the other rail provided rails 21$^a$ and 21$^b$ are energized from batteries 68 and 77 respectively. The signal device 49 is co-operatively operated by 41 and 42 to indicate the conditions of the block without regard to which set of amplifiers co-operate with either rail.

In the track arrangement shown in Fig. 4 it will be noted that a transformer 68$^a$ is substituted for the battery 68 in Fig. 2 so that the rail sections are energized by alternating current and the detector-amplifier as shown in Fig. 3 when running over this track generates an alternating current in armature 52 which by wires 54 and 55 energizes the primary of transformer 53. This transformer has a secondary coil 58 connected by wires 56 and 57 to the energizing coils 53$^a$ on the poles 22 and 23.

Another secondary coil 61 connects by wires 59 and 60 to the field coil 28 of the amplifier 16. The amplifier 16 operates a translating device similar to the arrangement shown in Fig. 1. It will be noted that the amplifier 17, Fig. 3, is constructed in the form of a D. C. generator having an armature 52 with a commutator which generates alternating current corresponding in frequency to the frequency of the current energizing the field. It should also be noted that if an amplifier, as in Fig. 1, having an armature 24 which varies the magnetic circuit between the poles 22—23 is used with the track arrangement in Fig. 4, an alternating current will be generated by the amplifier but the frequency will be somewhat irregular as a product of the frequency of the current energizing the field and the frequency created by the rotation of the armature 24.

In Fig. 6 a polarized track circuit arrangement is used with a means for changing the polarity with respect to the track rails. The relay 65 is provided with contact fingers 104 and 105 which are arranged to form a pole changer for battery 101 through connections 102 and 103. These contact fingers connect to the rail by wires 106 and 107. When relay 65 is energized the rails of the track circuit of the block in the rear are energized with one polarity and when this relay is de-energized the polarity of the track circuit current is reversed. Relay 65 may be a track relay controlling over one block as shown or it may be a line relay controlling over more than one block. The locomotive device is selectively operated by the polarity of the current in the track rails.

The arrangement in Fig. 5 may be used with the track arrangement shown in Fig. 6 in which the polarized relay 81 responds to the presence of current in the track rails and selectively to the polarity of this current. The poles of the detector amplifier 17 pass over the head of a rail and are magnetized by the current flowing in the rails. Armature 82 driven by motor 11, generates a current which is commutated to a direct current in wires 83 and 84 which energizes the field coil of amplifier 16 and this amplifier in turn energizes amplifier 15 which energizes the polarized relay 81. The amplifiers 15 and 16 are of the D. C. generator type, but generate a current having the characteristics of the current energizing their field coils. This relay has a neutral contact 88 and a polarized contact 90 which control the visual signal 93. When this relay is energized with current to position the polarized armature as shown, a circut is established from battery "B", through contact 88, wire 89, polarized contact 90 and wire 92 to the light indicated by "Y" and to the common return on wire "O". When the polarized armature 90 moves to its other circuit closing position, the circuit is established to wire 91 controlling the light indicated by "G" and when relay 81 is de-energized the circuit of the light indicated by "R" is established. This form of control for a three position signal is well known in the art.

The amplifier 17 is provided with self exciting coils 85 connecting by wire 86 with the armature of amplifier 16 and by wire 87 with the interrupter 94 and wire 87$^a$ to coil 85. This uses part of the amplified current for exciting the field of 17. It is apparent that with a system of this kind its primary impulse must be received from the track and its operation must at all times be under control of the track current. In order therefore that the system may not become self exciting or continue self exciting independently of the track the interrupter 94 is used and is driven by the shaft of motor 11. The result is that the poles of 17 are energized by a current somewhat similar to the curve shown in Fig. 5$^a$ in which the influence from the track rail is indicated by 97, the influence from 16 is indicated by 96 and the gap caused by the brush on the insulation 94$^a$ of the interrupter is indicated by 98. It is apparent that the curve 96 has to build up for each revolution of the interrupter from the current in the track. If the track current is absent, the current will not build up as indicated by the curve and the system becomes deenergized. Relay 81 may be made slow acting so that it will not release during the gap in curve 96.

The direct current in the rails in Fig. 6 will create a continuous polarity in the poles of 17, Fig. 5, which will cause the armature 82 to generate a continuous current of a definite polarity which ultimately energizes 81. When the polarity of the track current is changed the polarity of the current generated by 82 is reversed thus making possible the operation of a polarized system on the locomotive.

The arrangement in Fig. 7 combines a continuous and intermittent control system with which is included a speed control system. The detector amplifier 17 is driven by the motor 11 and has self exciting coils 33$^b$ energized by wires 113 and 114 controlled by the interrupter 94 when direct current is used in the track rails. Another circuit from the armature of 17 energizes wires 111 and 112 and the field coil 37 of amplifier 15. The amplifier 15 energizes wires 115 and 116 connected to the field coil 118 and armature 119 of the translating device 117. This rotates the armature 119 to raise the arm 120 and connection 121 connected to the walking beam 45.

The motor 11 drives the high frequency generator 122 which by wires 123 and 124 energizes the primary coil 125 of the transformer device 126. This device has a pair of poles between which the armature 127 rotates, being driven by a motor similar to 11, not shown on the drawings. The armature 127 is provided with a commutator and will generate direct current if the field is energized with direct current, or will generate alternating current if the field is energized with alternating current. In the present application, the field is constantly energized from the source of A. C. 122 which, normally, causes the generation of alternating current by the armature in wires 129—135; however, when the device comes directly under the influence of the track magnet 147, the magnetism of the track magnet partially suppresses the alternating current field and partially saturates the field with a constant magnetic flux so that the armature generates a current in accordance with the characteristics of the resultant current effective in energizing the yoke 126 which is direct current with a pulsating ripple. That is, the constant flux partially neutralizes one side of the A. C. field and the flux from the A. C. of the same sign is added to the constant flux. The magnetic circuit of 126 is designed with an non-magnetic gap in the core of coil 125 as shown, to insure this result.

The armature 127 normally generates alternating current from the field created by the input circuit of the primary coil 125. An alternating current output circuit is established by wire 135, coil 134, wire 133, contacts 132 closed by arm 120 in the raised or proceed position, wire 131, condenser 130 and wire 129 to armature 127. This will energize the field of the translating device 142 and hold the armature 136 in the position to which it has moved.

Another alternating current output circuit branches off in multiple with 134 by wire 158 connecting to 135 and wire 159 connecting to 131 to energize coil 160 of the translating device 156 thereby holding armature 157 in the position to which it has moved. An arm 155 connects to the armature 157 and operates valve 162 of the speed control system, Fig. 12, referred to hereinafter. The armatures 136 and 157 are thus held in position by alternating current from generator 122 until a disturbing condition is established.

Coacting with 126 is a magnetic device on the track consisting of the laminated poles 145 and 146 with the magnetizing coil 147 between these poles. In practice, the laminated poles vary in length and a plurality of energizing coils 147 are used. If the coil 147 is energized by direct current when the poles 148 and 149 align therewith a direct current field will be induced across the armature 127 causing this armature to generate a direct current with a pulsating ripple through its commutator while the A. C. field will be partially suppressed due to the saturation of the poles of 126 with the direct current flux from 147. The direct current, with the pulsating ripple, from armature 127 cannot effectively pass through condenser 130 but it energizes a direct current circuit from wire 128, through reactance 139, wire 140, coil of armature 136, field coil 141 and return by wire 135 to armature 127. This causes the armature 136 to rotate, raising arm 137 and rod 138 connected with the walking beam 45. Energizing coil 147 of the track magnet by direct current will result therefore in raising arm 137 to give a proceed signal and this signal is maintained after passing the track magnet by the current in the primary coil 125, provided 121 has been raised to close the circuit at 132.

The rotating armature or continuously moving device 127 amplifies the effect of the magnetic field in the output circuit 129 and 135 while no effect can be produced in the output circuit unless the armature is rotating; the failure of this armature thus to rotate detects itself by causing a control effect.

When the transformer device 126 encounters a track magnet which is deenergized, it is apparent that a magnetic shunt is provided for the poles 148 and 149 through the air gap and the core of the track magnet. This will deflect the A. C. magnetic flux created by coil 125 from the armature 127 thereby substantially deenergizing the holding coil 134, permitting the armature 136 to follow its bias to the stop position where it will remain until the circuit of coil 141 and armature 136 is energized. The reactance coil 139 prevents the armature 136 and coil 141 being effectively energized from the alternating flux created by coil 125.

It has been noted that coil 160 of the translating device 156 is connected in multiple with the holding coil 134 so that this device will become deenergized for the same reason that 134 becomes deenergized, permitting arm 155 to drop to the controlling position to initiate speed control.

A forestalling switch 161 is provided to connect armature coil 157 in multiple with coil 160 on wires 158 and 159. The switch will reset armature 157 to close valve 162 as long as the output circuit of 127 is energized with alternating current.

It is apparent that when the coil 147 is deenergized, the coil 160 becomes deenergized when 126 encounters the trackside magnet; also this coil may be accidentally deenergized, and the pulsating current generated in the output circuit 129—135 when 147 is energized with direct current will not effectively energize coil 160 so that in either case the arm 155 will be lowered and valve 162 will be moved to the position to initiate speed control and will stay in this position until reset by switch 161 or by the speed control reset device 153. This is a proper condition in the operation of the system as a braking operation cannot become effective until a caution condition is established and when this condition is established the valve 162 is in position to be reset by the speed control device.

On the poles 148 and 149 of the transformer device, the coils 150 are placed which are connected by wires 151 and 152 with the translating device 153. The coils 150 are on an open magnetic circuit and the device 153, under normal conditions, is deenergized. However, when the poles of the transformer device align with the track magnet, then coils 150 surround a closed magnetic circuit, that is to say, the magnetic circuit is completed through the air gaps, the track magnet and the core of coil 125. This magnetic circuit avoids the reactance of the rotating armature 127 and a current is thus induced in coils 150 which energizes the circuit of A. C. magnet 153 from the current in coil 125, as long as the transformer device is under the influence of the track magnet. The closed circuit of coils 150 is designed with a comparatively low reactance so as not to choke the A. C. shunted by the track inductor. If the track magnet is energized with direct current, the effect on coils 150 will be to produce a pulsating current in the circuit of relay 153 which will tend to move this relay to the resetting position. The speed control reset, however, is only required when speed control has been established, that is when the track magnet is deenergized and under this condition a large part of the A. C. flux from coil 125 is shunted through the track magnet core and through coils 150, thus fully energizing 153 to produce conditions for resetting the speed control mechanism. The track magnets are purposely varied in length so that the speed of the vehicle must be varied in order to obtain a uniform time for energizing 153. The principle upon which this time-distance speed control operates is fully explained in U. S. Patent 1,299,595 of April 8, 1919.

The device 153 operates a plunger 154 having a hook on its lower end engaging the arm 155 so that when this device raises the plunger, the arm 155 is moved to the non-controlling position in which position it is held by coil 160 until this coil is effectively deenergized. The device 153 is arranged to be slow acting, that is, to require a time interval for its operation; this may be secured electrically or pneumatically by means which are well known in the art at the present time.

The reset switch 161 need only be operated ensuing a brake application, that is, when the resetting device 153 has failed to reset valve 162 under caution conditions. This switch may be remotely located and should be operated to reset 155 when running under caution or control conditions so that the speed control system may be operative at deenergized magnets occurring in succession along the trackway.

It will be noted that if coil 147 of the track magnet is short circuited it will have a choking effect on the A. C. flux from the poles 148 and 149 which choking effect may be used to modify the operation of the system, as hereinafter referred to.

The operation of the circuits referred to under the different conditions of trackway control used in this system will be more fully understood by the following discussion and by reference to the skeleton circuits in Fig. 17 and the graphic representations of the characteristics of the current shown in Fig. 18.

In the application of a train control system it is necessary to communicate the conditions on the trackway to the moving train, and, usually, it is desirable to communicate to the train a variety of effects corresponding to different conditions in the block and the safe speed at which the train may proceed. In order to avoid complications it is highly desirable that as few communicating devices as possible be used at each controlling station to obtain these results. In a system operated inductively, that is, where no physical contact is made between the locomotive device and the trackway device, it is necessary to give a characteristic to the inductive impulse that can be selectively translated on the vehicle and utilized for any specified purpose. In this way a variety of effects may be established on the train corresponding to trackway conditions from a single set of co-operating inductive elements. It should be understood that the control effects are obtained by the relative values of the currents energizing the operating circuits which can be increased or decreased under certain condition of the trackway devices and while they are thus effectively deenergized these circuits are not entirely deenergized. The extent to which the operating circuits are energized or deenergized depends upon a number of conditions including the air gap separating the coacting inductors on the trackway and on the locomotive. It is necessary to design the translating devices to operate within this margin of energizing and deenergizing to secure the proper operation of the invention.

In the intermittent inductive part of the system described in connection with Fig. 7 there are three operating circuits which are operated in various ways in response to four trackway conditions. These are as follows: (a) The holding circuit including translating devices 134 and 160; (b) the resetting circuit including the translating devices 136 and 141 and (c) the speed control reset, including device 153. These circuits operate: (d) under normal running from one trackway device to the next trackway device, (e) when the trackway and locomotive devices are in register and the trackway device is energized by direct current, (f) the same condition, when the trackway device is deenergized with the circuit of its energizing coil open and (g) the same condition when the trackway magnet or inductor is deenergized and the circuit of its energizing coil closed.

In the present arrangement the combined transformer and generator 126 is arranged with an energizing coil permanently connected to a source of alternating current 122. This coil is wound on the core 125 which may be provided with an air gap to increase the magnetic reluctance of this core. The flux created by this coil is distributed in a pair of parallel magnetic circuits, one of which includes the rotating armature 127 and is known as the generator path and the other is through the depending poles 148 and 149 and the air gap between these poles, the reluctance of which is varied by the trackway inductor at controlling stations, where the poles 145 and 146 of the trackway magnet register with poles 149 and 148; this is known as the shunt path.

As the input circuit coil 125 is permanently energized by a source of alternating current this sets up a field for the generator 127 by which an output circuit of alternating current is taken from the commutators of the armature of the same characteristic as the current in coil 125 but amplified by the mechanical energy supplied to the armature. As the coil 147 of the trackway device may be energized by direct current, a direct current field is thereby induced in the poles 148—149 as the vehicle device passes over the trackway device, which field is distributed through core 125 and the generator path 127. The air gap in core 125 causes a considerable portion of the direct current flux to pass through the generator path whereby a direct current is super-imposed upon the A. C. current obtained from the commutator of armature 127. As arranged, the holding circuit of 134 and 160 is energized through a condenser by the alternating current from 127, while the resetting circuit of 136 and 141 is energized through a reactance from the direct current (with the A. C. ripple) obtained from the armature 127. The condenser and reactance make the holding circuit and the resetting circuit substantially selective to the alternating current and to the direct current with the A. C. ripple obtained from the armature 127.

The characteristics of the currents in the holding circuit, the resetting circuit and the speed control reset circuit will be understood from the graphic representations of these currents under the different operating conditions as illustrated in Fig. 18, considered in connection with the skeleton circuits in Fig. 17.

Under running conditions between control stations $a$ indicates the current in the resetting circuit from armature 127, by wire 135, resetting coils 141 and 136, wire 140, reactance coil 139 and wire 128 to armature 127. The reactance 139 chokes down the alternating current created by coil 125 to a negligible quantity as indicated in the graph. This current will not set the apparatus to the proceed position or hold the apparatus in the proceed position. The holding circuit from arm 137 comprises armature 127, wire 135, magnet coil 134, wire 133, contact 132 (closed), wire 131, condenser 130 and wire 129 to armature 127; also the parallel circuit by wire 135, wire 158, magnet coil 160, wire 159, condenser 130, wire 129 and armature 127, is energized under normal running conditions with alternating current created by coil 125 and generator 122, corresponding to $b$. This current holds the mechanism controlled by coils 134 and 160 in the proceed position, if these mechanisms have been placed in this position.

The poles 148—149 of the device 126 are provided with coils 150 connected to the circuit 151—152 and to the translating device 153. It is apparent that such portion of the A. C. flux generated by coil 125 as passes between the poles 148—149 energizes coils 150 by a transformer action from coil 125. Owing to the wide air gap between 148—149 it is evident, in normal running, that the reluctance of this path is so great that the speed control reset device 153 is substantially deenergized as indicated by the graph $c$.

When the vehicle device 126 registers with the trackway device 145—146 and the coil 147 of the trackway device is energized with direct current it is apparent that on the magnetic yoke 126, a direct current flux is super-imposed upon the A. C. flux created by coil 125. This suppresses the side of the A. C. flux which opposes the D. C. flux and increases the magnetic effect on the other side of the A. C. flux, producing a current characteristic corresponding to $d$ in armature 127. This current is unidirectional and energizes the resetting circuit from wire 135, magnet coils 141 and 136, wire 140, reactance coil 139 and wire 128 to armature 127. Energizing coil 147 corresponds to clear track conditions and as a result the coils 141 and 136 are energized to place the controlled mechanism in the proceed position.

Under these conditions the alternating current supplied through condenser 130 to the holding circuit of 134 and 160 is changed to a pulsating current having the characteristics of $e$. As the resetting circuit is now energized, the mechanism controlled thereby is removed from the control of holding coil 134 and it does not effect the operation of the system whether or not this current energizes coil 134 sufficiently to hold the mechanism controlled thereby in the proceed position; however, it is preferred that this coil be so designed that it will hold the mechanism in the proceed position under the conditions described. It will be noted that as 126 passes away from the influence of the trackway device the A. C. flux created by coil 125 is restored to its normal characteristic thus energizing the holding circuit including coil 134 to hold the mechanism reset which has been moved to the reset position by 141 and 136 until the next trackway device is encountered.

The holding coil 160 is energized by the current $e$ through condenser 130 in parallel with 134. The coil 160 may be so wound that this current will hold the mechanism controlled thereby in the position in which it has been placed so that under these conditions, with the trackway coil energized by direct current, the speed control system is not initiated. However, if this current is not sufficient to effectively energize 160, for any reason, the valve 162 will be moved to the position to initiate speed control and stay in this position until reset manually or by the speed control reset device.

Part of the A. C. flux produced by coil 125 in unison with the D. C. flux traverses the trackway inductor through the aligning poles, and the air gap. This energizes the coils 150 with pulsating current having characteristics corresponding to $f$. The device 153 is preferably designed to respond to this current in such a way as to reset the speed control mechanism; however, it should be noted that the speeed control mechanism cannot function to control when the trackway coil 147 is energized to reset 137 and, usually, under the conditions of clear track the speed in passing a control station is such that there would not be sufficient time for the complete operation of the time element device 153.

When the coil 147 is deenergized and on open circuit a condition of control is established so that when 126 registers with 145—146 the A. C. current in the resetting circuit is further reduced by the extent to which the A. C. flux is shunted from the generator circuit through the trackway device. This is indicated by graph $g$ showing that the resetting coils 136 and 141 cannot be energized to reset the mechanism to the proceed position.

The current in the holding circuit is reduced to a negligible quantity as the major portion of the A. C. flux is shunted away from the armature 127 through the poles 148—149 and the trackway inductor. The air gap between the poles of the vehicle device and the trackway inductor is included in this path, but the area of the poles is enlarged to reduce the reluctance of the magnetic circuit. It should be noted that the generator armature 127 sets up a reactance to the magnetic flux in the generator path as it generates current and the air gap between the poles and the armature further increases the reluctance of this path, thereby deflecting the A. C. field through the trackway inductor and producing a current in the holding circuit having the characteristic of graph $h$ which effectively deenergizes the holding coils 134 and 160 and thus the conditions of control are established by causing the brake control valves 50 and 162 to assume the controlling position at the same time.

As the larger part of the A. C. flux from coil 125 is deflected through the trackway device, the coils 150 are thus embodied in a closed magnetic circuit of which 125 is the primary and 150 is the secondary with the result that the secondary circuit is fully energized as indicated by the graph $j$ and the time element control device 153 is thus energized to reset the speed control apparatus controlled by coil 160, previously deenergized to the non-controlling position, during the time the vehicle and trackway devices are in register. If the speed is low enough or if the trackway device is of sufficient length to afford the necessary time for 153 to reset the speed control mechanism, a brake application will be avoided, otherwise the apparatus will function to cause a control effect through the braking system.

The normal application of the system contemplates the trackway device having the coil 147 energized with direct current for clear conditions and having this coil deenergized and on open circuit for control conditions as described above and shown at 202 and 203 in Fig. 8. It is possible to modify the control effect to a certain extent by closing the circuit of coil 147 when it is deenergized as indicated at 187—188 in Fig. 8 where the circuit of these coils is closed by relay 172, deenergized as hereinafter described. This sets up a choking effect which increases the reactance of the trackway inductor to the A. C. flux from coil 125. When applied as shown, this modifying effect maintains the holding circuit of 134—160 energized when passing a deenergized track device and prevents resetting of the speed control or energizing of 153. Such an arrangement might be useful on ascending grades or approaching turnout switches where the continued movement of heavy trains is preferred to producing a stop effect.

It will be noted from graph $k$ that with the coil 147 deenergized and on closed circuit the resetting circuit of coils 141 and 136 is not energized and no resetting of same can be effected.

Since the closed coil on 147 increases the magnetic reluctance through the trackway inductor, the deflection of the A. C. field from coil 125 is thereby reduced so that the larger part of this magnetic field is impressed upon the armature 127 producing an alternating current according to graph $l$ for energizing the holding circuit of 134 and 160. Thus the conditions established will be maintained by the holding circuit although the trackway device is deenergized.

The absence of the A. C. flux through the trackway device prevents an increase of current in the speed control reset circuit so that 153 is not operated to reset the speed control or to prevent the speed control, as will be understood from the characteristic of the current indicated by graph m. Thus, if any condition of speed control were established for instance on a slow moving train and a trackway device were encountered that was deenergized and had its coil on closed circuit the speed control mechanism would not be reset to change the conditions of speed control.

It will be noted that the system described is made up of a combination of elements, each functioning by itself and independently of the others and all cooperatively functioning to produce a train control system as described. For instance, the continuous control operating device 117 may be used by itself for showing conditions in one block, the intermittent control operating device 142 may be used by itself for showing conditions in one block control, and these elements may be combined to produce a system controlling over two blocks, generally known as a three position system, with the continuous control dominating the intermittent control as a preferred application. These controls, through the walking beam 45 operate the brake valve 50.

The speed control apparatus operating valve 162 is ancillary to the apparatus above referred to and is used only when speed control is desired. If omitted, the other apparatus will function in the normal manner and the device 50 will apply the brakes without reference to speed.

In fact, the speed control apparatus cannot become effective to control the train of itself, but is dependent upon the device 49 being in a restrictive position with either or both of the devices 117 and 142 in the controlling position. Thus, should the coil 160 be deenergized or should the arm 155 temporarily assume the controlling position this control effect does not effect the braking system until the valve 50 has assumed the position of control by the deenergizing of coil 147, or by the failure of the trackway current to energize 117, or until an open circuit has developed in the system. Owing to the cooperative braking control between valves 50 and 162 it is fundamental to the system that if a clear condition is established following a condition of speed control the braking control is immediately removed.

Train control is often installed initially in an elementary form to produce control only of a single character and a system such as described that is capable of being installed piecemeal to any degree desired is of considerable importance.

For single track operation as shown in Fig. 8 one track rail is used to give the continuous inductive influence for traffic in one direction and the other rail is used for traffic in the opposite direction. Devices are also located on the track for giving an intermittent signal to the vehicle. The track is divided into blocks, A, B, C, D and E each of which is provided with the usual track circuit. Relay 170 of block B for traffic from left to right is controlled by wire 173, contact 174 of track relay for section C, wire 175, and contact 176 of track relay for section D to battery B. This relay controls the circuit of battery 179 through contact 178 and wire 177 thereby energizing the top rail of section B when sections C and D are clear. Corresponding conditions prevail with reference to relay 170 for sections D and E, etc.

Traffic from left to right is also controlled by the track magnets 187 and 188. Relay 172 of block B is controlled by wire 180 through contact 181 of relay 170 for section B and by wire 182 through contact 183 of relay 170 for section C. Relay 172 is therefore controlled over the same portion of track as the corresponding relay 170 plus an additional section. Relay 172 energizes the magnets 187 and 188 from battery 184 through contact 185, wire 186 to the magnets and wire 189 to battery. When relay 172 is deenergized a circuit is closed between wires 186 and 190 which short circuits coils 187 and 188 thereby producing the reactance of a closed coil in these magnets. The circuits for magnets 187 and 188 are shown for one location only for the sake of simplicity.

The traffic from right to left is controlled by relay 171 for each block. This relay for any particular block is controlled by wire 194, through contact 195 of the track relay for the next section in advance and by wire 196 and through contact 197 of the next track relay to battery; thus its control extends for two blocks ahead of the block where it is located. Relay 171 through contact 192 and wires 191 and 193 controls the battery or transformer for the lower rail of each track section. Thus in order for a westbound train to receive a proceed signal in section D, sections C and B must be clear and in order for a train to proceed through section B in the opposite direction sections C, D and E must be clear.

Traffic from right to left is also controlled by track magnets 202 and 203 on the opposite side of the track. These magnets in a particular block are controlled by wire 201, contact 200 of relay 171 for that block, wire 199 and contact 198 of relay 171 at the next location where the control connects to battery B and returns on the common wire O to wire 204 connecting to magnets 202 and 203. These track magnets are therefore controlled through relays 171 for two succeeding blocks.

When a vehicle wired as shown in Fig. 7 runs over a track wired as shown in Fig. 8, the detector amplifier on one side of the vehicle will receive a continuous inductive impulse from the track rail when the track is clear and raise one end of the walking beam 45. When the transformer device 126 encounters an energized track magnet on the opposite side of the track, the other end of the walking beam is raised. When the vehicle turns around to run in the opposite direction these conditions are reversed, the continuous impulse being received from the other rail and the intermittent effects being obtained from the magnets on the other side of the track, the locomotive device 17 being responsive to the direct current in circuit 177 and to the alternating current in circuit 191 and in the former case delivering direct or alternating current to coil 37 according to its design. It will be noted from the track plan that track magnets cannot be energized unless the track rails are also energized, and in the vehicle wiring the holding coil 134 cannot be energized unless the arm 120 is in the raised or clear position to close contacts 132. Hence if the continuous effect is not received from the rail no other effect can be received on the vehicle.

It will be noted from Fig. 8 that the track magnets vary in length being shorter as the end of the block is approached. This requires the vehicle to run slower over the short magnets in order to properly energize the timing device 153 and thus requires a reduction of speed as the vehicle runs through a block that is not clear.

It will be noted that the track magnets 187 and 188 in section B are short circuited when relay 172 is deenergized; these magnets will therefore give a proceed effect to the vehicle when they are energized and will produce no effect on the magnet 153 when they are shunted owing to the choking effect of the coil 147.

The arrangement shown in Fig. 9 may be adapted for coupling the amplifiers and motor on the same shaft, as shown at 210. The efficiency of the poles 22 in collecting the magnetic flux from the rail is materially improved by extending the poles below the rail head. Ordinarily this cannot be done owing to the clearance required for passing over other rails. In the arrangement shown flexible extensions are provided on the poles in the form of magnetic studs 211 which have a ball 212 seating in the hollow nut 213 and held vertical by the spring 214. This provides a ball and socket connection which is free to turn in any direction and can thus be pushed aside by any objects on the track. It will be noted that the trackway inductor having the poles 145 and 146 is level with the top of the running rail and the poles 148—149 of the vehicle device are in position to be influenced by the magnetic iron of the track rails as well as the inductor poles. In order to prevent false operation from this cause the generator 122, as stated, generates high frequency current and the poles 145—146 are laminated so as to have a low reactance to this current relative to the reactance of the track rails. This is featured in U. S. Patent 1,627,567, May 10, 1927.

The braking arrangement is shown in Figs. 12 and 13 and is similar in operation to that shown in U. S. Patent 1,627,567, issued May 10, 1927. The valve 50 is operated by the signal device and the valve 162 is operated by the speed control device. With the plunger 281 in the clear position as shown air is admitted from supply pipe 282 to pipe 283 and cylinder 284 raising piston 285 against spring 286. When plunger 281 moves down the air supply is cut off and pipe 283 is exhausted through port 287 which exhausts cylinder 284 and permits piston 285 to return from supporting the weighted arm 293.

When the plunger 289 is in the position shown air is admitted to pipe 288 feeding cylinder 290 and raising piston 291 which raises the weighted arm 293 through 292. When the plunger 289 moves down air is exhausted from cylinder 290 and piston 291 returns from supporting the arm 293. The weighted arm 293 is pivoted at 254 and has a detent 294 engaging the ratchet wheel 253 connected with the valve 252. It will be noted that if both pistons 285 and 291 are released at the same time the weighted arm will move down moving the ratchet wheel around one step; but if either or both pistons are raised the ratchet wheel is not moved. Thus under a clear signal the ratchet is not moved and under a predetermined low speed which tapers as the vehicle runs towards the end of the block, the ratchet wheel is not moved. From this it will be observed that relay 153 and device 156 may be in the controlling position in a clear block without affecting the braking system. The operation of these devices to apply the brakes becomes effective only after a restrictive signal has been received by 45. If the apparatus is set for clear conditions and a track magnet is encountered with the coil 147 deenergized, the coil 160 is immediately deenergized and also the holding coil 134 is deenergized. This starts the valves 281 and 289 to the position to exhaust the cylinders 284 and 290 to lower the pistons supporting the arm 293; however as the time period of 153 is comparatively short this magnet is energized by the magnetic yoke of the track magnet before the apparatus can function to lower arm 293 provided that the speed of the vehicle is such as to consume the required time in passing over the track magnet. If the speed is in excess of the permissible speed the magnet 153 will not be energized to reset 157 automatically and with 137 in the down position the braking apparatus will be permitted to function to apply the brakes. 157 may be restored to the non-controlling position at any time, provided 126 is not in co-operative relation with a track side magnet, by the push button 161. Thus it will be understood that under clear track conditions the speed control apparatus is prevented from affecting the braking system and under caution conditions the brakes are applied but may be prevented from applying by relay 153 being picked up when a predetermined speed is not exceeded.

In Fig. 13 the braking system is indicated by the pipe 251 which connects to the valve 252. This valve has an inner sleeve 255 connected by the stem 254 with the ratchet wheel 253. A row of ports is provided in this sleeve indicated by 257 and a second row in staggered relation to the first indicated by 256. The air pipe 258 aligns with one row of ports and the air pipe 259 aligns with the other row of ports. One of these ports is arranged to register with the one or the other pipe for each step of wheel 253.

The pipes 258 and 259 connect with the synchronizing valve 260 and are continued therefrom by pipes 261 and 262 to the manual release valve 268 which is generally remotely located and not readily accessible when the vehicle is running. This valve has an inner sleeve 269 operated by the handle 270 and has a port 271 aligning with pipe 262 and another port in staggered relation indicated by 272 which aligns with pipe 261. The interior of this valve exhausts through 273. When the handle 270 is set to close one port, by the same action it opens the port to the other pipe. As shown it will be noted that pipe 258 opens into the interior of valve 252 and through the passage 264 and pipe 261 is closed by sleeve 269. Pipe 262 connects with the interior of valve 268 and through passage 263 to pipe 259 where it is closed by sleeve 255. If the handle 270 is moved or if the wheel 253 moves one step there is a through passage from the interior of 252 to the interior of 268 which exhausts the air and leads to a brake application. This application can only be forestalled by moving the manual release to synchronize with the position of the stepping wheel. For each step of the wheel the manual release must change its position to prevent the escape of air.

If the vehicle is being controlled by the regular brake valve it is unnecessary to use the manual release or in fact supersede the engineman by an automatic device. For this reason the synchronizing valve is used co-operatively with the brake valve. This device is shown at 260 comprising a circular chamber having an interior member rotating about the centre 267 with the passages 263, 264, 265 and 266 therein. When in the position shown pipes 258 and 261 form one continuous passage and pipes 259 and 262 form one continuous passage but when turned through 180° passage 266 connects pipes 259 and 261 and passage 265 connects pipes 258 and 262. Thus the connections of the pipes entering at either side of the synchronizing valve are reversed each time the valve is operated. This has the effect of synchronizing the valves 252 and 268 or cancelling the effect of a step made by wheel 253.

The engineer's brake valve is indicated at 274, Fig. 14. This valve is pivoted at 275 and has a cam 276 at one side as shown. The handle of the synchronizer is indicated by 277 pivoted to the shaft 267 of the interior member. A cam 279 is secured to this handle which has a segment 278 cut away on each side to provide space for the cam 276. When in the position shown it is apparent that handle 277 is rigidly locked by the cam 276. When, however, the handle 274 is moved to the application position indicated by a the handle 277 is released and may be turned through 180° to operate the synchronizer. In this position the opposite segment 278 registers with the cam 276 so that when the braking handle is restored, the synchronizer is again locked and cannot be changed until another brake application is made. The synchronizer is disclosed as separately manually operated but it is apparent that it can be coupled with the brake valve and operated therewith if so desired.

The operation of the brakes, particularly for long trains requires an intermittent action in order that the triple valves may function properly. An action of this kind is secured by the brake application valve, Figs. 15 and 16. This valve consists of a body 301 in which a large plunger 302 and a small plunger 303 operate under the force of weight 304 when the air pressure below these plungers is reduced. The chamber 300 is supplied with air pressure from the locomotive by pipe 305 and when under full pressure the plungers are raised. The pressure in chamber 300 is released by pipe 251 of the braking system and is released at a greater rate than pipe 305 can supply so that the pressure gradually falls and with it the small plunger 303 which supports weight 304.

As the small plunger descends a passage is opened from 310, through 311, port 313, through 312 and 317 to reducing valve 318. Continued downward motion of the plunger 303 shuts the passage between 311 and 312 as the part between 313 and 314 is opposite 311, and again when the part between 314 and 315 is opposite 311. Passage 310 connects with the brake pipe 250 and this action of opening and shutting the passage between 311 and 312 produces an intermittent application of the brakes. It should be noted that the annular port 313 is longer than the other ports thus producing a long application initially to be followed by a series of shorter applications.

When the small plunger is in the position shown in Fig. 16 weight 304 is resting upon the top 316 of the large plunger and thereafter both plungers will move together. The downward movement of the large plunger aligns the annular ports 322, 323 and 324 with the passage 310 and the passage 321 leading to the reducing valve 325, thus providing another series of brake applications through a different reducing valve and owing to the larger displacement of the large plunger its downward movement is slower than that of the small plunger.

When the pipe 251 is closed the plungers are raised by the increasing pressure in chamber 300; this movement, however, should not operate the brakes; a directional valve is, therefore, provided to vent the brake pipe only on the downward movement of the plungers. This valve has a piston operating in chamber 307 which has a stem with a port 309. When the pressure is reduced in chamber 307, spring 308 aligns the port 309 with the brake pipe 250 connecting it with passage 310 thereby making the system operative by causing a brake pipe reduction through 318 or 325. The pressure in 307 is reduced when pipe 251 is opened and is increased when this pipe is closed, that is, when the pressure in chamber 300 is being built up to restore the plungers. It is understood that other types of directional control valves may be used for this purpose. It will be noted that passages 311 and 312 do not align on the circumference of the large plunger. This enables 317 to be staggered with relation to 310 so that the ports 322, etc. will not exhaust through 317 unless 317 is arranged to align with 310.

The reducing valves may be set for different reductions in pressure as indicated thereby varying the braking effect.

It is apparent that the elements of the various forms of this invention may be applied separately with any system of train control and these elements may be combined and applied in a manner different from that shown in the drawings without departing from the intent and spirit of the invention. It is also apparent that other forms of amplifiers may be used to increase the effect of the inductive impulse from the track.

Having thus described my invention, I claim:

1. In a train control system, the combination of a railway track, a vehicle thereon, said track divided into blocks, means controlled by traffic conditions for energizing a rail of each block with direct current, and a device on said vehicle continuously responding to the current in said rail and delivering an amplified alternating current therefrom.

2. In a train control system, the combination of a railway track, a vehicle thereon, said track divided into blocks, means controlled by traffic conditions for energizing one rail of said blocks, means on said vehicle responding to the current in said rail and a plurality of means one supplying electrical energy to the other and supplied with mechanical energy for amplifying the effects from said rail.

3. In a train control system, the combination of a railway track, a vehicle thereon, said track divided into blocks, means controlled by traffic conditions for energizing a rail of said blocks, means on said vehicle responsive to the current in said rail, means for amplifying the effect from said current and means for using said amplified effect for partially energizing said vehicle responsive means.

4. In a train control system, the combination of a railway track, a vehicle thereon, said track divided into blocks, means controlled by traffic conditions for energizing a rail of said blocks with continuous direct current, a device on said vehicle responsive to the current in said rail, means for amplifying the effects from said current and means for utilizing part of said amplified effects for increasing the effects from said rail on said device.

5. In a train control system, the combination of a railway track, a vehicle thereon, said track divided into blocks, means controlled by traffic conditions for energizing a rail of said blocks with direct current, means on said vehicle responsive to the current in said rail, and an amplifier on said vehicle energizing a circuit, said circuit controlled by the current in said rail, said circuit also including an automatic interrupter and arranged to energize said vehicle responsive means.

6. In a train control system, the combination of a railway track, a vehicle thereon, said track divided into blocks, means controlled by traffic conditions for energizing a rail of said blocks with direct current, means on said vehicle responsive to the current in said rail, and an amplifier on said vehicle energizing a circuit including an automatic interrupter, said circuit being controlled by the current in said rail.

7. In a train control system, the combination of a railway track, a vehicle thereon, means for energizing a rail of said track, a device on said vehicle having a magnetic yoke responsive to the current in said rail, means for amplifying the effects from said current and means for using part of said amplified effect for energizing said magnetic yoke.

8. In a train control system, the combination of a railway track, a vehicle thereon, means for energizing a rail of said track with direct current, a device on said vehicle having exciting coils, said device responsive to the current in said rail, means for amplifying the effects from said current and means for using said amplified effect intermittently for energizing said exciting coils.

9. In a train control system, the combination of a railway track, a vehicle thereon, means for energizing a rail of said track, a device on said vehicle responsive to the current in said rail, a self exciting circuit which is periodically interrupted and associated with said device, and a source of energy on said vehicle controlled by the current in said rail for energizing said self exciting circuit.

10. In a train control system, the combination of a railway track, a vehicle thereon, magnetic devices on said track of varying lengths, a transformer device on said vehicle having a magnetic circuit responding to said track device but without making physical contact therewith, a coil in said magnetic circuit and a timing device operated by said coil.

11. In a train control system, the combination of a railway track, a vehicle thereon, means for energizing a rail of said track, a device on said vehicle responsive to the energy in said rail, and flexible magnetic extensions depending from said vehicle device adjoining the head of said rail.

12. In a train control system, the combination of a railway track, a vehicle thereon, means for energizing a rail of said track, a device on said vehicle responsive to the energy in said rail, magnetic extensions from said device adjacent the head of said rail and secured to said device by a ball and socket connection.

13. In a train control system, the combination of a railway track, a vehicle thereon, a brake controlling mechanism on said vehicle including a brake valve and a release, means whereby said brake valve and release must be moved in synchronism to prevent a brake application and means whereby said devices may be independently synchronized.

14. In a train control system, the combination of a railway track, a vehicle thereon, a brake controlling mechanism on said vehicle including a brake valve and a release, means whereby said valve and release must be moved in synchronism to prevent a brake application, an engineer's brake valve, and means associated with said engineer's brake valve for independently synchronizing said devices.

15. In a train control system, the combination of a railway track, a vehicle thereon, a brake controlling mechanism on said vehicle including a brake valve and a manually operated release, an engineer's brake valve and means locked mechanically by said engineer's brake valve for preventing the operation of said release.

16. In a train control system, the combination of a railway track, a vehicle thereon, a brake controlling mechanism on said vehicle including a brake valve and an engineer's valve, and means locked mechanically by said engineer's brake valve for preventing a braking operation, said means being released when said engineer's valve is in the application position.

17. In a train control system, the combination of a railway track, a vehicle thereon having a braking system and a controlling mechanism, including a brake application valve and a plurality of reducing valves, of different characteristics, means on said track coacting with said mechanism for operating said valve, said valve arranged to make a series of applications of said braking system successively through each of said reducing valves.

18. In a train control system, the combination of a railway track, a vehicle thereon having a braking system and a controlling mechanism, including a brake application valve, means on said track coacting with said mechanism for operating said valve and means including said application valve for making a service and an emergency application of the braking system each in a series of applications in comparatively rapid succession.

19. In a train control system, the combination of a railway track, a vehicle thereon having a braking system and a controlling mechanism including a brake application valve with a pair of plungers cooperatively connected whereby one of said plungers completes its operation before the other and means on said track coacting with said mechanism for operating said plungers, each of said plungers arranged to apply the brakes a number of times in succession for each operation.

20. In a train controlling system, the combination, a railway track divided into blocks, a relay for each block, a trackway circuit controlled by said relay, a trackway device controlled by said relay, a vehicle on said track, a mechanism on said vehicle comprising traffic governing means, said means continuously controlled by said trackway circuit as the train moves over the track and a device embodied in said mechanism simultaneously controlled by said trackway circuit and by said trackway device.

21. In a train controlling system, the combination, a railway track divided into blocks, a trackway circuit and a trackway device for each block, a vehicle on said track having a mechanism responding to the traffic conditions in said blocks, said mechanism having an element continuously responsive to said trackway circuit when the latter is energized and an element simultaneously responsive to said trackway means, said last named element being controlled by said first named element.

22. In a train controlling system, the combination, a railway track divided into blocks, a trackway circuit and a trackway device for each block controlled by traffic conditions, a vehicle on said track having a mechanism responding to traffic conditions on said track, said mechanism comprising an element inductively responsive to the current in said trackway circuit as the vehicle moves over the track and an element responsive to said trackway device, said last named element being controlled by said first named element.

23. In a train controlling system, the combination, a railway track, a trackway circuit and a trackway device controlled by traffic conditions on said track, a train on said track, a device on said train continuously responsive to said trackway circuit as said train moves over the track and a second device on said train inductively responsive to said trackway device and controlled by said first named device, said devices controlling a traffic governing mechanism on said vehicle.

24. In a train controlling system, the combination, a railway track, a trackway circuit and a trackway device controlled by traffic conditions on said track, a vehicle on said track, a translating device on said vehicle continuously energized in response to the energy in said trackway circuit as the vehicle moves along the track and a device inductively controlled from said trackway device and controlled by said translating device, said devices controlling a traffic governing mechanism on said vehicle.

25. In a train controlling system, the combination, a track with a trackway circuit and a trackway device electrically controlled by traffic conditions, a train on said track having traffic governing mechanisms, means on the train continuously responsive to the current in said trackway circuit as the train moves along the track and means on the train responsive to said trackway device and controlled by said continuously responsive means and controlling said mechanisms.

26. In a train controlling system, the combination, a railway track, a trackway circuit and a trackway device controlled by traffic conditions, a train on said track having a cab signal giving a clear and a stop indication, means on the train continuously responsive to the current in said trackway circuit as the train moves along the track and other means on the train responsive to said trackway device controlling said cab signal, said first mentioned means controlling said second mentioned means to prevent the display of a clear signal when said trackway circuit is deenergized.

27. In a train controlling system, the combination, a railway track, a trackway circuit and a trackway device controlled by traffic conditions, a train on said track having a cab signal giving a proceed and a stop indication, means on said train continuously maintained in an active condition by the current in said trackway circuit as the train moves over the track and other means on said train responsive to said trackway device controlling said signal to give a proceed indication when energized and said first mentioned means preventing the energization of said second mentioned means except when in its active condition.

28. In a train controlling system, the combination, a railway track, a trackway circuit and a trackway device controlled by traffic conditions, a train on said track having traffic governing mechanisms comprising a device with an armature continuously responsive to the current in said trackway circuit and a second device responsive to said trackway device and controlled by said armature.

29. In a train controlling system, the combination, a railway track, a trackway circuit and trackway devices controlled by traffic conditions, a train on said track having traffic governing mechanisms comprising a device continuously energized in response to the current in said trackway circuit and a second device intermittently controlled by said trackway devices and means whereby when said continuously controlled device is deenergized, said intermittently controlled device is deenergized.

30. In a train controlling system, the combination, a railway track, a trackway circuit and a trackway device controlled by traffic conditions, a train on said track having traffic governing mechanisms comprising a device continuously energized in response to the current in said trackway circuit and a second device simultaneously controlled by said trackway device, said devices cooperatively operating said mechanism to produce clear conditions on the train.

31. In a train controlling system, the combination, a railway track, a trackway circuit and a trackway device controlled by traffic conditions, a train on said track having traffic governing mechanisms comprising means continuously energized in response to the current in said trackway circuit as the train moves over the track and a second means simultaneously operating in response to said trackway device, said means cooperatively operating said mechanism in accordance with traffic conditions on the track.

32. In a train controlling system, the combination, a railway track, trackway circuits and trackway devices controlled by traffic conditions for train movements in both directions on said track, a train on said track having traffic governing mechanisms comprising means continuously energized in response to the current in said trackway circuits as the train moves over the track and a second means operating in response to said track devices, said means cooperatively operating said mechanism in accordance with traffic conditions on the track.

33. In a train controlling system, the combination, a railway track, divided into blocks for traffic in both directions, trackway circuits and trackway devices controlled by traffic conditions on said track, a train on said track having traffic governing mechanisms comprising means continuously energized in response to the current in said trackway circuits, as the train moves over the track and a second means operating inductively in response to said track devices, said means operating said mechanism in accordance with traffic conditions in each direction on said track.

34. In a train controlling system, the combination, a railway track divided into blocks, trackway circuits and trackway devices controlled by traffic conditions on said track, a train on said track having traffic governing mechanisms comprising an amplifying device, means continuously energized through said amplifying device in response to the current in said trackway circuits as the train moves over the track and a translating device inductively responsive to said track devices, said means and said translating device operating said mechanism in accordance with traffic conditions.

35. In a train controlling system, the combination, a railway track, divided into blocks, trackway circuits and trackway devices controlled by traffic conditions on said track, a train on said track having traffic governing mechanisms comprising a speed control means, means continuously energized in response to the current in said trackway circuits as the train moves over the track operating said mechanisms and a translating device simultaneously responsive to said track devices operating said speed control means.

36. In a train control system, the combination of a railway track, a vehicle thereon, means for energizing a rail of said track, a magnet device on said track, a device on said vehicle continuously energized from the energy in said rail and a device on said vehicle responsive to said magnetic device, said continuously energized device controlling the circuit of said magnetic responsive device.

37. In a train control system, the combination of a railway track, a vehicle thereon, means for energizing a rail of said track, devices located on said track, means for receiving a continuous effect from the current in said rail and an intermittent effect from said track devices, the intermittent effect being dependent upon the operation of the apparatus associated with the continuous effect.

38. In a train control system, the combination of a railway track, a vehicle thereon, means for energizing a rail of said track, devices located on said track, means for receiving a continuous effect on said vehicle from the current in said rail and an intermittent effect from said track devices, the intermittent effect being controlled by the apparatus associated with the continuous effect both on the track and on the vehicle.

39. In a train controlling system, the combination, a railway track divided into blocks, trackway circuits and trackway devices controlled by traffic conditions on said track, a train on said track having traffic governing mechanisms comprising a speed control means, means continuously energized in response to the current in said trackway circuits as the train moves over the track and a translating device responsive to said trackway devices operating said speed control means, said translating device controlled by said continuously energized means.

40. In a train control system, the combination, a railway track with a magnet thereon, a train on said track having a transformer device responding to said magnet, means on said train for energizing said transformer device with alternating current, an output circuit normally energized from said alternating current and means whereby said track magnet changes the characteristics of said out-put circuit.

41. In a train control system, the combination, a track with a vehicle thereon, said vehicle having an inductor with an input circuit energized with alternating current and an output circuit and a trackway inductor having a constant magnetic field arranged to saturate the vehicle inductor with direct current flux to change the character of the current in said output circuit.

42. In a train control system, the combination, a track with a vehicle thereon, a magnetic device on said vehicle having poles normally energized by alternating current and having an output circuit and an inductor on the trackway energized with direct current and arranged to saturate the poles of the magnetic device on the vehicle to change the character of the current in said output circuit.

43. In a train control system, the combination, a track with a vehicle thereon, a magnetic device on said vehicle having poles normally energized by alternating current and having an output circuit energized from said alternating current, and an inductor on the trackway energized with direct current and arranged to saturate the poles of the vehicle device whereby the current in said output circuit is changed from alternating to pulsating.

44. In a train control system, the combination, a track with a vehicle thereon, a magnetic device on said vehicle having poles normally energized by alternating current and having an output circuit energized from said alternating current, a plurality of translating devices connected with said output circuit and an inductor on the trackway energized with direct current and arranged to influence said vehicle device whereby the character of the current in said output circuit is changed, said translating devices being selectively responsive to the characteristic of the current in said output circuit.

45. In a train control system, the combination, a track with a vehicle thereon, a device on said vehicle having poles energized by alternating current and having an output circuit energized from said alternating current, a translating device connected with said output circuit through an inductance and another translating device connected with said output circuit through a condenser and an inductor on said trackway energized by direct current and arranged to influence said vehicle device to change the character of the current in said output circuit to energize one of said translating devices and deenergize the other translating device.

46. In a train control system, the combination, a track with a vehicle thereon having an inductor energized with alternating current and an output circuit energized by said alternating current, a plurality of translating devices connected on said output circuit, means for saturating said inductor with direct current flux to change the characteristic of said output circuit, said translating devices being selectively responsive to the characteristic of the current in said output circuit.

47. In a train control system, the combination, a track divided into blocks, a vehicle on said track having an inductor energized with alternating current and having an output circuit energized by said alternating current, an inductor on the trackway controlled by traffic conditions through said blocks and means for saturating said vehicle inductor by direct current flux from said trackway inductor to change the characteristic of the current in said output circuit.

48. In a train control system, the combination, a track divided into blocks, a vehicle on said track having an inductor energized with alternating current and having an output circuit, a plurality of translating devices connected in said output circuit, an inductor on the trackway controlled by traffic conditions through said blocks and means for saturating said vehicle inductor by direct current flux from said trackway inductor to change the characteristic of the current in said output circuit, said translating devices being selectively responsive to the characteristic of the current in said output circuit.

49. In a train control system, the combination, a track with a vehicle thereon having an inductor energized with alternating current and a plurality of output circuits energized by said alternating current, a translating device connected in each of said output circuits, an inductance in one of said output circuits and a capacitance in the other of said output circuits and means for saturating said inductor with direct current flux to change the character of the current in said output circuit to selectively operate said translating devices.

50. In a train control system, the combination, a track with a vehicle thereon having an inductor energized from a source of alternating current on the vehicle and having an output circuit delivering an amplified current having a characteristic corresponding to said alternating current and means on the trackway for changing the characteristic of said output circuit.

51. In a train control system, the combination, a track with a vehicle thereon having an inductor energized by a source of current on the vehicle and having an output circuit delivering an amplified current corresponding to said energizing current, a moving member operatively associated with said inductor, a translating device connected in said output circuit and means on the trackway for changing the characteristic of said output circuit for affecting the operation of said translating device.

52. In a train control system, the combination, a track divided into blocks and a vehicle on said track, an inductor on said vehicle energized by a source of current on the vehicle and having an output circuit delivering an amplified current, a moving member operatively associated with said inductor, a plurality of translating devices controlled by said output circuit and a device on said trackway controlled by traffic conditions in said blocks and influencing said vehicle inductor to change the characteristic of the current in said output circuit, said translating devices being selectively responsive to the characteristic of the current in said output circuit.

53. In a train control system, the combination, a track divided into blocks and a vehicle on said track, a device on said vehicle having a member moving independently of the movement of the vehicle, an input circuit normally energized by a source of current and an output circuit delivering an amplified current, an inductance and a condenser connected in said output circuit, a plurality of translating devices controlled by said output circuit and by said moving member and a device on the trackway controlled by traffic conditions in said blocks and influencing said vehicle device inductively to change the characteristics of the current in said output circuit, whereby one of said translating devices is energized and the other is deenergized.

54. In a train control system, the combination, a track divided into blocks, a track relay for each of said blocks, a vehicle on said track, a device on said vehicle having an input circuit energized from a source of current on the vehicle and an output circuit delivering an amplified current and a continuously moving member associated with said device, a translating device controlled by said output circuit and a device on the trackway controlled by traffic conditions through said relay and inductively influencing said vehicle device while said member is in motion to change the characteristic of the current in said output circuit.

55. In a train control system, the combination, a track divided into blocks and a vehicle on said track, a device on said vehicle having an input circuit energized from a source of current on the vehicle and an output circuit delivering an amplified current and a member moving continuously independently of the movement of the vehicle associated with said device, a translating device controlled by said output circuit and arranged to produce a restrictive condition on the vehicle, a device on the trackway controlled by traffic conditions in said blocks for influencing said vehicle device to change the charactristics of said output circuit and means whereby the restrictive condition is established by said translating device as the movement of said member ceases.

56. In a train control system, the combination, a track divided into blocks and a vehicle on said track, a device on said vehicle having an input circuit energized from a source of current on the vehicle and an output circuit delivering an amplified current and a member moving continuously independently of the movement of the vehicle associated with said device, a translating device controlled by said output circuit and normally held in a proceed position while said member is in motion and a device on the trackway controlled by traffic conditions in said blocks for influencing said vehicle device to change the characteristics of said output circuit whereby the position of said translating device is changed.

57. In a train control system, the combination, a track with a vehicle thereon, a device on said vehicle capable of being inductively influenced and having an input circuit energized from a source of current on the vehicle and an output circuit delivering an amplified current, a member moving continuously independently of the movement of the vehicle associated with said device, a translating device controlled by said output circuit and a device on the trackway controlled by traffic conditions for inductively influencing said vehicle device while said member is in motion to change the character of the current in the output circuit.

58. In a train control system, the combination, a track divided into blocks, a track relay for each of said blocks and a trackway circuit of which the running rail forms a part controlled by traffic conditions in said blocks through said relay and simultaneously energized, a vehicle on said track having means inductively responsive simultaneously to said trackway device and to said trackway circuit, a member moving independently of the movement of the vehicle, associated with said means, a translating device operated by said means and means for selectively operating said translating device by said trackway device through said moving member.

59. In a train control system, the combination, a track divided into blocks, a track relay for each of said blocks, and a trackway circuit of which the running rail forms a part controlled by traffic conditions in said block, through said relay, said device and said trackway circuit being simultaneously energized, a vehicle on said track having means inductively responsive simultaneously to said trackway device and to said trackway circuit, a member moving independently of the movement of the vehicle associated with said means, a translating device operated by said means through said moving member and means for deenergizing said translating device when said trackway circuit is deenergized.

60. In a train control system, the combination, a track divided into blocks, a track relay for each block and a trackway circuit of which the running rail forms a part controlled by traffic conditions in said blocks through said relay, said device and said trackway circuit being simultaneously energized, a vehicle on said track, a three position mechanism on said vehicle, a member moving independently of the movement of said vehicle and means inductively responsive to said trackway device and to said trackway circuit for operating said mechanism through said moving member.

61. In a train control system, the combination, a track divided into blocks, a track circuit with a track relay for each block, a trackway device and a trackway circuit of which the running rail forms a part, controlled by traffic conditions in said block through said relay, a vehicle on said track having means inductively responsive to said trackway circuit, a member continuously moving on said vehicle independent of the movement of said vehicle and a translating device on said vehicle controlled by said trackway device and said trackway circuit through said moving member.

62. In a train control system, the combination, a track divided into blocks, a track circuit with a track relay for each block, a trackway device and a trackway circuit of which the running rail forms a part controlled by traffic conditions in said blocks through said relay, a vehicle on said track having means inductively responsive to said trackway device and circuit, a member continuously moving on said vehicle independent of the movement of said vehicle and a three position translating device on said vehicle selectively controlled by said trackway device through said moving member.

63. In a train control system, the combination, a track divided into blocks, a track circuit with a track relay for each block, a trackway device and a trackway circuit of which the running rail forms a part, controlled by traffic conditions in said block, through said track relay, a vehicle on said track having means inductively responsive to said trackway circuits, a member continuously moving on said vehicle independent of the movement of said vehicle and a translating device controlled by said means and operated to a proceed position when said trackway circuit is energized and means for changing the position of said translating device to a less restrictive position by said trackway device effective only when said trackway circuit is energized.

64. In a train control system, the combination, a track divided into blocks, a track circuit with a train relay for each block, a trackway device and a trackway circuit of which the running rail forms a part controlled by traffic conditions in said block through said track relay, a vehicle on said track having means inductively responsive to said trackway circuit and including a continuously moving member, a translating device controlled by said means and having an element energized when said trackway circuit is energized and means controlled by said trackway device through said moving member for effectively energizing another element of said translating device effective only when said trackway circuit is energized.

65. In a train control system, the combination, a track divided into blocks, a track circuit with a track relay for each block, a trackway device and a trackway circuit of which the running rail forms a part, controlled by traffic conditions in said blocks through said track relays, a vehicle on said track having means inductively responsive to said trackway circuits and including a continuously moving member, a three position translating device controlled through said means by said trackway device and by said trackway circuit for placing said translating device in an unrestrictive condition effective only when said trackway circuit is energized.

66. In a train control system, the combination, a track divided into blocks, a track relay for each block, a trackway device and a trackway circuit of which the running rail forms a part controlled by said relay, a vehicle on said track having means inductively responsive to said trackway circuit and amplifying means, having an output circuit, an inductance and a capacitance in said output circuit and a plurality of translating devices connected on said output circuit and selectively responsive to said trackway device through said amplifying means.

67. In a train control system, the combination, a track divided into blocks, a track relay for each block, a trackway device and a trackway circuit of which the running rail forms a part controlled by said relay, a vehicle on said track, inductive means on said vehicle responsive simultaneously to said trackway device and said trackway circuit having a controlling circuit including inductance and capacitance and a plurality on translating devices selectively responsive to said vehicle means.

New York, June 22, 1922.

MATTHEW H. LOUGHRIDGE.